United States Patent [19]

Sidman

[11] Patent Number: 5,680,641
[45] Date of Patent: Oct. 21, 1997

[54] MULTIPLE REGISTER BANK SYSTEM FOR CONCURRENT I/O OPERATION IN A CPU DATAPATH

[75] Inventor: Steven B. Sidman, Vancouver, Wash.

[73] Assignees: Sharp Microelectronics Technology, Inc., Camas, Wash.; Sharp Kabushiki/Kaisha, Osaka, Japan

[21] Appl. No.: 515,645

[22] Filed: Aug. 16, 1995

[51] Int. Cl.$^6$ .................................................. G06F 12/00
[52] U.S. Cl. ........................... 395/840; 395/856; 395/858
[58] Field of Search ......................... 395/800, 873, 395/425

[56] References Cited

U.S. PATENT DOCUMENTS

| 5,163,132 | 11/1992 | DuLac et al. | 395/275 |
|---|---|---|---|
| 5,185,876 | 2/1993 | Nguyen et al. | 395/425 |
| 5,222,223 | 6/1993 | Webb, Jr. et al. | 395/425 |
| 5,313,648 | 5/1994 | Ehlig et al. | 395/800 |

OTHER PUBLICATIONS

R. Bhatia, M. Furuta and J. Ponce, *Proceedings of the ICASSP — 1991 International Conference on Acoustics, Speech, and Signal Processing*, IEEE, Toronto, Canada, May 14–17, 1991, pp. 1085–1088.

S. Furber, *VLSI RISC Architecture and Organization*, Marcel Dekker, Inc., 1989, pp. 111–117, 123–131.

D. A. Patterson and John L. Hennessy, *Computer Architecture A Quantitative Approach*, Morgan Kaufmann Publishers, Inc., 1990, pp. 450–454.

R. Zaks, *Programming the Z80*, 3d Edition, SYBEX, Inc., 1982, pp. 61–65.

M. Slater, *Microprocessor–Based Design, A Comprehensive Guide to Hardware Design*, Prentice Hall, Inc., 1989, pp. 50–52.

*i960*™ *CA Microprocessor User's Manual*, Intel Corporation, 1992, pp. iii, 2–1 through 2–4, 3–30 through 3–33, 3–82, and 3–86 through 3–87.

M. Johnson, *Superscalar Microprocessor Design*, Prentice-Hall, Inc., 1991, pp. 41–45, 50–55, 159–163.

A. van Sommeren and C. Atack, *The ARM RISC Chip, A Programmer's Guide*, Addison–Wesley Publishing Co., 1993, pp. 21–35, 107–119.

*Primary Examiner*—Thomas C. Lee
*Assistant Examiner*—Forood Boortalary
*Attorney, Agent, or Firm*—David C. Ripma; Gerald Maliszewski

[57] ABSTRACT

A system and method is provided for use in register-based CPUs for processing data in the CPU register bank while concurrently loading and unloading data into additional register banks. The additional register banks are then sequentially connected to the CPU datapath for data processing. Interconnections between the various register banks in the CPU and appropriate data buses for performing the load/process/unload functions are controlled by a load/store control logic block which can be a simple state machine processor. The load/store control logic is triggered by a software instruction encountered at the end of particular computational routines during normal program execution. This software instruction replaces the need for separate load and store instructions and their attendant clock cycles. The invention substantially decreases unused data processor time since the arithmetic and logic unit (ALU) can be sequentially connected to register banks which have been preloaded with data for processing. The need to stop data processing through the ALU while data is loaded into an unloaded from the CPU register bank is eliminated. A method of register-based CPU concurrent I/O operation is also disclosed.

5 Claims, 6 Drawing Sheets

THE TREE REGISTER BANK IMPLEMENTATION
SHOWN AS A CIRCULAR BUFFER OF REGISTER BANKS

| SEQUENCE | I/O AND PROCESSOR PORTS: | REGISTER A (100) 50, 51, 52, 53 | REGISTER B (102) 50, 51, 52, 53 |
|---|---|---|---|
| 1 | CONNECT TO BUSES: | 45 66 62 64 PROCESS | 120 145 LOAD/UNLOAD |
| 2 | CONNECT TO BUSES: | 120 145 LOAD/UNLOAD | 45 66 62 64 PROCESS |
| 3 | CONNECT TO BUSES: | 45 66 62 64 PROCESS | 120 145 LOAD/UNLOAD |
| 4 | CONNECT TO BUSES: | 120 145 LOAD/UNLOAD | 45 66 62 64 PROCESS |
| · · · · | | | |

FIG.4

| SEQUENCE | I/O AND PROCESSOR PORTS: | REGISTER A (200) 50, 51, 52, 53 | REGISTER B (202) 50, 51, 52, 53 | REGISTER C (204) 50, 51, 52, 53 |
|---|---|---|---|---|
| 1 | CONNECT TO BUSES: | 45 66 62 64 PROCESS | UNLOAD 145 | 120 LOAD |
| 2 | CONNECT TO BUSES: | 120 LOAD | 45 66 62 64 PROCESS | UNLOAD 145 |
| 3 | CONNECT TO BUSES: | UNLOAD 145 | 120 LOAD | 45 66 62 64 PROCESS |
| 4 | CONNECT TO BUSES: | 45 66 62 64 PROCESS | UNLOAD 145 | 120 LOAD |
| 5 •••• | CONNECT TO BUSES: | 120 LOAD | 45 66 62 64 PROCESS | UNLOAD 145 |

FIG.6

MULTIPLE REGISTER BANK SYSTEM FOR CONCURRENT I/O OPERATION IN A CPU DATAPATH

BACKGROUND AND SUMMARY OF THE INVENTION

The invention relates generally to computers and, more particularly, to the central processing unit (CPU) of a register-based computer.

General purpose register-based computers employ one or more banks of data storage registers within the CPU, where data is temporarily stored during arithmetic or other data processing. The data storage registers are usually arranged in register banks, also known as register blocks. The size of the register banks is determined by the internal architecture of the computer and is a matter of design choice. Data flows into and out of the registers of the CPU through buses which connect with larger computer memory storage units and with the arithmetic and logic unit (ALU) of the CPU. A 32-bit CPU will typically have 32-bit data buses and 32-bit registers, allowing the data to be moved through the datapath in parallel. The data storage register banks in a CPU, together with certain other specialized registers for storing instructions and memory address information, the ALU, and the connecting data buses used in data the processing, are collectively called the CPU datapath.

In a register-based CPU, data is moved and processed in accordance with programming instructions from a software decoder and logic control block, which is external to the datapath but is operatively connected to all major elements in the CPU. Data is retrieved from the computer's main or cache memory and loaded into the register bank of the CPU. Once the register bank has been loaded, operands in individual registers are processed by the ALU in accordance with program instructions from the logic control block. For example, the ALU might add or multiply together the contents of two different registers and store the result in a third register location. Once the computational processing is complete, the data is unloaded from the register bank and sent to main memory or another location in the computer. Register-based CPUs are flexible and efficient. Registers speed up processing because data can be quickly supplied to the ALU and stored in other register locations without having to load and store data through the computer's comparatively slower main memory.

While register-based CPUs are efficient in processing data, the actual active compute time in which data is processed in a single CPU datapath represents only a fraction of the total time of the processing cycle. Data must first be loaded into the CPU's register bank from memory, then processed through the ALU, and the processed data is then unloaded from the register bank and transferred to memory or elsewhere. Thus, only during the process step, when the data is resident in the register bank, does actual computing occur. The CPU is not performing actual data processing during the loading and unloading of the register banks.

It would be advantageous to provide a CPU processing system and architecture which would make greater use of the processing ability of the CPU, without requiring major changes to the operation of the CPU or to the programming software which controls its operations.

It would also be advantageous in a register-based CPU, to employ the ALU more of the time during data processing, by minimizing the idle time of the ALU, when the CPU's register bank is being loaded and unloaded.

It would also be advantageous to improve the computational efficiency of a CPU datapath in a register-based computer by performing sequential block computations on data stored in a plurality of pre-loaded register blocks, without having to pause the computational sequence during loading and unloading of the registers.

Accordingly, a datapath is provided for a register-based CPU of the type used in processing data that is carried to and from the CPU by one or more data buses under commands from one or more external controllers. The datapath comprises one or more arithmetic processors operatively connected to an external programmable controller for processing data as directed by the programmable controller. A plurality of data storage register banks are provided in the datapath. At least two of the register banks are interchangeable, each being intermittently connected to the one or more arithmetic processors in order to process the data therein. Each of the interchangeable register banks includes one or more I/O ports for loading and unloading data, and at least one processor port for connecting to the one or more arithmetic processors when the data in the register bank is processed.

The datapath also includes a register function controller operatively connected to the interchangeable register banks for selectively connecting the processor ports of a first group of register banks, consisting of one or more of the register banks, to said arithmetic processors. The data in the first group of register banks is processed when the processor ports of that first group is connected to the processors. The controller also selectively connects I/O ports of a second group of register banks, consisting of one or more of the register banks, to the data buses of the datapath. Data is loaded into and unloaded from the second group of register banks when the I/O ports are connected to the data buses. The datapath thus configured allows data to be loaded and unloaded from the second group of register banks while the data in the first group of registers is concurrently processed by the arithmetic processors. The register function controller also selectively interchanges the first group of register banks with other interchangeable register banks in the datapath so that the data in the new first group of register banks can be processed while other interchangeable register banks, forming a new second group, are connected to the data buses for loading and unloading of data.

The invention further includes a method for use in the datapath of a register-based CPU of the type which processes data carried to and from the CPU by one or more data buses under commands from one or more external controllers. The steps in the method comprise concurrently connecting a first group of one or more register banks within the CPU to one or more arithmetic processors whereby data stored in the first group of register banks is processed by the arithmetic processors; and concurrent with the previous step, connecting a second group of one or more register banks to the data buses of the datapath in order to load data into and unload data from the registers in the second group of register banks; and upon completion of the processing of the data in the first group of register banks and the loading and unloading of the data from the second group of register banks, selectively interchanging the registers in the first group of register banks with other interchangeable register banks containing data to be processed.

BRIEF DESCRIPTION OF THE DRAWINGS

FIG. 4 is a table illustrating the port interconnection sequences for the embodiment of FIG. 3.

FIG. 6 is a table illustrating the port interconnection sequences for the embodiment of FIG. 5.

DETAILED DESCRIPTION OF THE PREFERRED EMBODIMENT

Figure 1:
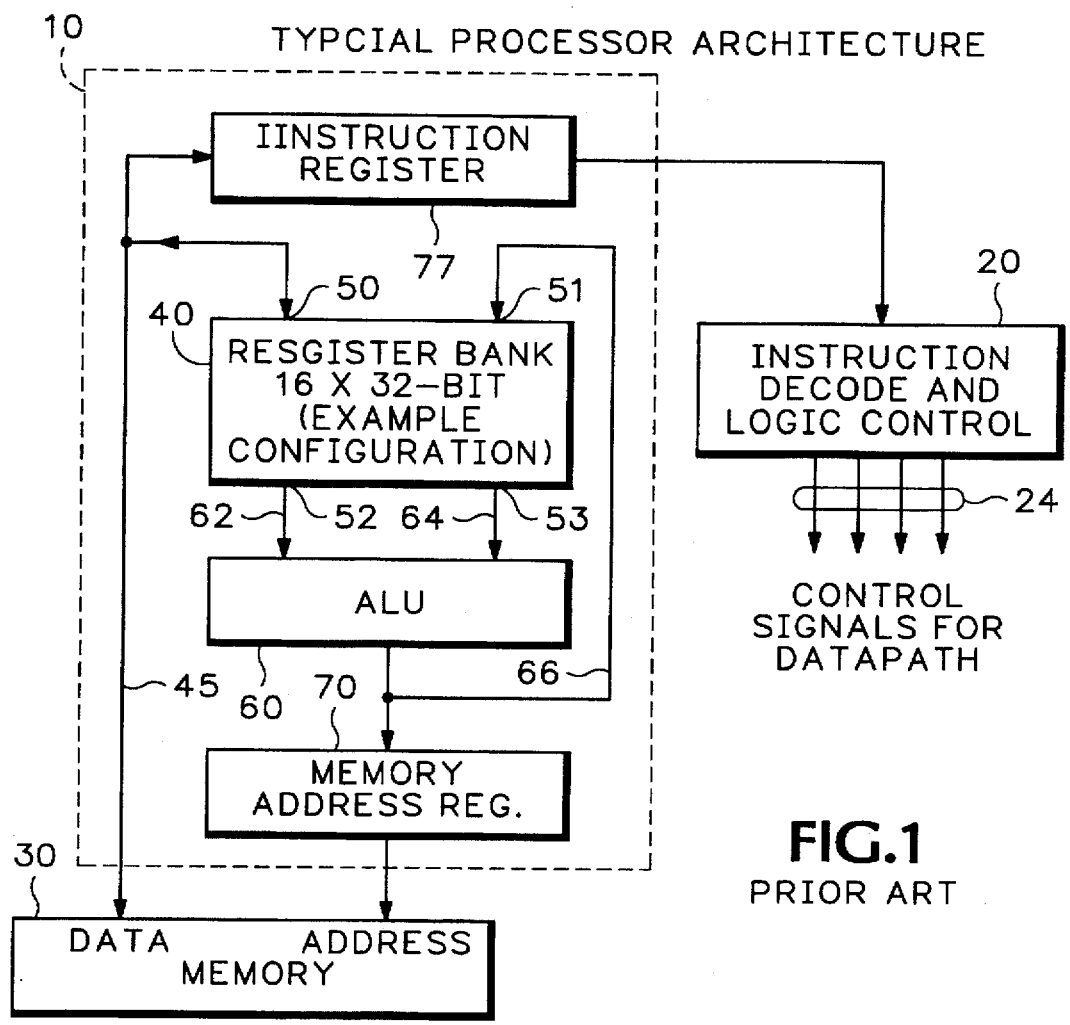
FIG. 1 (prior art) is a schematic illustration of a CPU datapath in a register-based computer.

FIG. 1 (prior art) shows a representative prior art CPU datapath for a register-based computer. Datapath 10 includes the elements of the CPU which handle the computation of data. FIG. 1 is a simplified schematic illustrating the main active elements and connecting data buses of datapath 10. Numerous operational connections familiar to those skilled in the art have been omitted from FIG. 1 and the other figures herein in order to clearly illustrate the essential features of the present invention. For example, the instruction decode and logic control block 20 is operationally connected to all the illustrated elements in datapath 10 via a plurality of signal paths illustrated schematically at 24. Instruction decode and logic control block 20 is an external controller for datapath 10 and controls the various elements of the datapath, as well as other parts of computer (not shown) based on software programming and control signals supplied to the logic control block 20 in the manner well known to those skilled in the art. The other external element shown in FIG. 1 is memory block 30, which schematically represents the computer's main memory, including cache memory. Data and operational instructions are retrieved from and stored in memory 30 by datapath 10, using the coding and instruction format of the computer. The present invention is directed to the architecture of datapath 10 and is not limited to any particular software or instruction format or type.

The datapath 10 shown in FIG. 1 is a simplified schematic showing the essential elements of a prior art register-based CPU. A register bank 40 consisting of sixteen 32-bit data storage registers is shown at 40. Register banks of different sizes may alternatively be used with the present invention. Register bank 40 may also contain additional storage registers for holding program status information or the like. The present invention is directed to the data storage registers used in computation functions and not the various status registers which might also be provided in a CPU datapath.

Data bus 45 is a 32-bit bus which carries data to and from memory 30. Register bank 40 has one or more input/output ports (I/O ports) for loading and unloading data into the registers. As illustrated in FIG. 1, register bank 40 has I/O ports 50, 51, 52, 53. Port 50 connects to datapath 45. Ports 52, 53 supply data from register bank 40 to the arithmetic and logic unit (ALU) 60 of the CPU. The ALU performs mathematical computations via connecting buses 62, 64. Buses 62, 64 are schematic. Typically, two or more main data buses are provided in a CPU datapath for carrying data between the major elements of the CPU. That allows the ALU to read a plurality of registers simultaneously. The result of an ALU operation is returned to the register bank via a separate bus line illustrated schematically in FIG. 1 at 66.

ALU results may alternatively be written to a memory address register 70, which supplies address information to computer memory 30 for the storage of data unloaded from register bank 40 and returned to memory via bus 45. ALU results may also be returned directly to memory through memory address register 70, in accordance with programming instructions from logic control block 20. A separate programming instruction register 77 is also provided in datapath 20 for sending instructions to logic control block 20. The instruction register stores instructions in response to an instruction fetch command from the logic control block, which bypasses the ALU.

Figure 2:
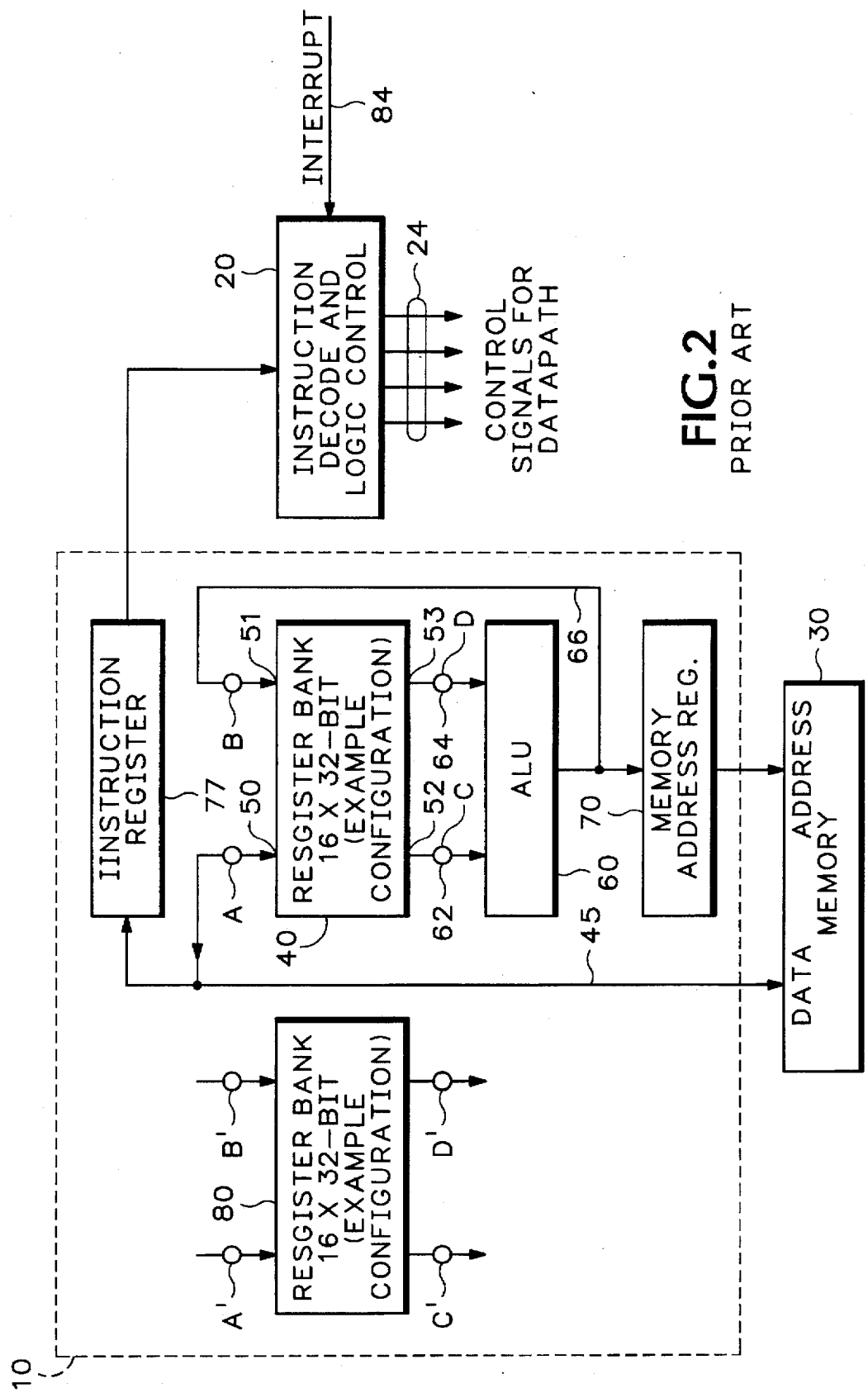
FIG. 2 (prior art) is a schematic illustration of a CPU datapath as in FIG. 1 including a second register bank for processing interrupts.

FIG. 2 is a schematic of a datapath 10 and associated devices similar to that shown in FIG. 1. Like elements in FIG. 2 have been assigned the same reference numbers used in FIG. 1. The datapath 10 shown in FIG. 2 includes one prior art approach to solving computational inefficiencies presented by the loading and unloading of data into register bank 40. That problem is the "down time" of ALU 60 whenever data is being loaded or unloaded from the register via the one or more of the I/O ports 50, 51, 52, 53. The ALU cannot process data or perform computations during loading or unloading. The retrieval from storage of data in memory 30 takes at least several clock cycles. Storage addresses must be identified for each data item transferred. In some circumstances the load/unload delay to access memory 30 is unacceptable. A program interrupt, for example, wherein the computer software interrupts the CPU processing to handle and alternative computation given priority by the computer requires the active register bank 40 to be cleared of data. FIG. 2 shows one solution used by several computer manufacturers to avoid the delay which such an event would cause. This solution is to provide a second parallel register bank 80, similar or identical to register bank 40, which can be swapped for register bank 40 upon receipt of an interrupt command. The interrupt is illustrated schematically in FIG. 2 by arrow 84. Upon receipt of an interrupt instruction, the CPU will typically complete the calculation in progress and then swap register bank 80 for register bank 40 to preserve the data in register bank 40. In that way the contents of register bank 40 need not be unloaded to memory 30 in order to free the registers for interrupt processing. The substitution of register bank 80 for register bank 40 within datapath 10 speeds interrupt response time and allows the CPU to quickly return to its pre-interrupt state when the interrupt event is completed.

In FIG. 2, the swapping of register banks 40 and 80 is illustrated schematically. The data bus lines to I/O ports 50, 51, 52, 53 have been assigned and letters A, B, C, D, respectively. Identical I/O bus lines are connected to I/O identical ports 50, 51, 52, 53, on register bank 80 which are designated A', B', C', D'. The connections through bus lines A, B, C, D, are redirected through lines A', B', C', D' when the register banks are swapped during an interrupt. As will be understood by those skilled in the art, the actual switching of connections between register banks 40 and 80 is accomplished by suitable multiplexer switches (not shown) controlled by logic control block 20 within datapath 10. The configuration of a multiplexer for accomplishing the swap between register banks 40 and 80 will depend on the number and location of the I/O ports and processor ports and can be accomplished as required by the layout and wiring of the datapath 10. Alternatively, register banks 40 and 80 need not be necessarily physically separated from one another and, in fact, might be part of a single larger register bank. Functionally, register bank 80 remains separate and unused except during interrupt response and the I/O and processor ports 50, 51, 52, 53, on register bank 80 are disabled and unconnected to any external data buses except during interrupt response. If register banks 40 and 80 are both part of a larger block containing a plurality of register banks, the I/O and processor ports of the portion of the block containing register bank 80 are disabled until needed for interrupt response. Numerous variations on the physical architecture to carry out the function of register bank 80 as part of interrupt response are available in the prior art and other alternatives will readily occur to those skilled in the art.

The technique of providing a redundant data storage register bank 80 for fast interrupt response is used in many register based CPUs, for example, the Z80, manufactured by Zilog, Inc. of Campbell, Calif. and the ARM 600 series of RISC processors. The technique of FIG. 2 saves time during interrupts and preserves the processor state during CPU data processing but, as presently used, is limited to interrupt functions only.

Figure 3:
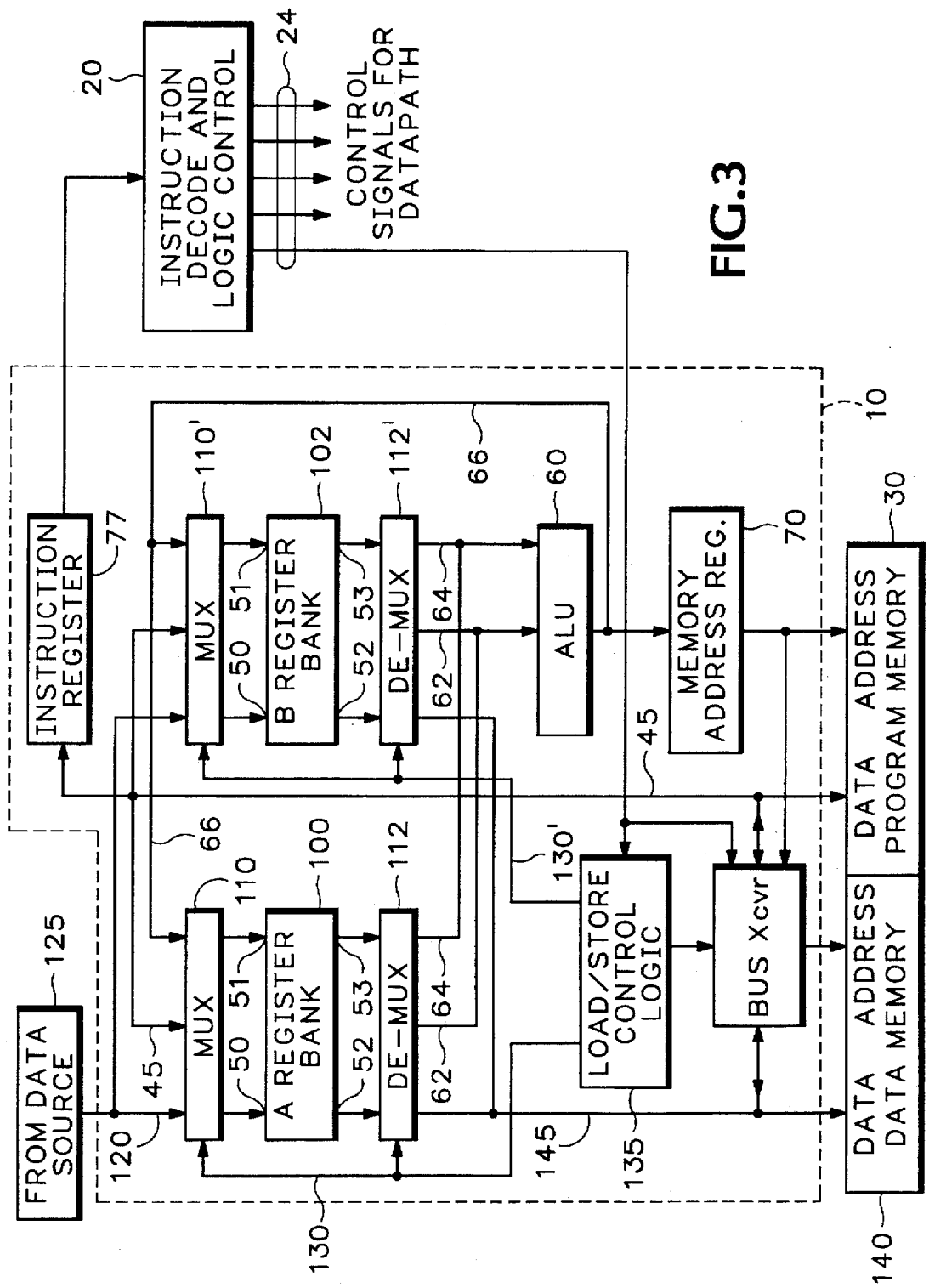
FIG. 3 is a schematic illustration of a first embodiment of a CPU datapath having two interchangeable register banks for concurrently performing processing and load/unload functions.

FIG. 3 illustrates a first embodiment of the present invention. Those elements of CPU datapath 10 which are common to the original prior art datapath illustrated in FIG. 1 have been assigned the same reference numbers in FIG. 3 and the functionality of those elements is the same as the elements previously described with reference to FIG. 1. In the CPU datapath 10 of FIG. 3, two identical and interchangeable register banks, identified as register 100 and register 102, are used to load, process, and unload data for CPU computations. The difference between register banks 100 and 102 and register bank 40 in FIG. 1 is that I/O and processor ports 50,51, 52,53, as illustrated and described in FIG. 1, and as provided on register banks 100, 102 are connected to multiplexers 110, 110' and de-multiplexers 112, 112'. The purpose of the multiplexers and de-multiplexers is to provide a means for selectively connecting the ports of register banks 100, 102 to the ALU 60 and data bus 45.

Multiplexer 110 includes at least 3 sources of data for loading and unloading data into the registers of register bank 100. One input to multiplexer 110 is data bus 45 and another is ALU output bus 66. A third input is from an alternate data source 125 via bus 120. The alternative data source 125 might be, for example, a real-time data stream from a digitized video or audio signal. Multiplexer 110 selects from these data sources based on commands to the multiplexer supplied on control line 130 from load/store control logic block 135. Load/store control logic block receives control instructions from computer logic control block 20 in accordance with a pre-programmed instructions based on the computer's operating software.

Multiplexer 110' also has a plurality of input data sources for connecting to ports 50, 51 and register bank 102. The data sources are same data sources supplied to multiplexer 110. Multiplexer 110' is controlled by load/store control logic block 135 by a line 130' in the same manner as multiplexer 110.

The interpositioning of multiplexers 110, 110' between the data inputs and the I/O input ports of register banks 100, 102, respectively, effectively increases the number of I/O ports to the register banks by allowing for at least an additional source of data to be connected to the register banks 100, 102.

De-multiplexer 112 is connected to processor ports 52, 53, of register bank 100 and directs data to ALU 60 via buses 62, 64. An alternative output transfer location from de-multiplexer 112 is to a separate data storage location 140, via bus 145.

De-multiplexer 112' receives data from processor ports 52, 53, of register bank 102 and, like de-multiplexer 112, directs data to buses 62, 64, and 145. De-multiplexers 112, 112' are both controlled by load/store control logic block 135 via lines 130, 130', respectively. The operative effect of installing de-multiplexers 112, 112' between the processor ports of 52, 53, of register banks 100, 102, respectively, and ALU 60, is to select which of the two register banks 100, 102, is connected to the ALU 60. Similarly, multiplexers 110, 110' are alternatively connected to data buses 45 and 66, or to bus 120, depending on the control instructions received from load/store control logic 135.

FIG. 4 is a table illustrating the sequence of connections effected by load/store control logic 135, multiplexers 110, 110' and de-multiplexers 112, 112'. The connections to the I/O and processor ports 50, 51, 52, 53, for register bank 100 are in the left column beneath "Register A(100)." In the sequence step 1 of the table ports 50, 51, 52, 53, of Register 100 are connected, respectively, to buses 45, 66, 62, 64. As such, register bank 100 is being employed in processing data. Concurrently with the aforementioned connections to register bank 100, the I/O processor ports 50, 51, 52, 53, of register bank 102, are as shown in the right column of sequence step 1, beneath the title "Register B(102)." Port 50 of register 102 is connected to bus 120 and port 52 is connected to bus 145, which means register bank 102 is in the load/unload made of operation. In the next sequence, step 2, port 50 of register bank 100 is connected to bus 120 and port 52 is connected to bus 145, and register bank 100 is in the load/unload mode. Concurrently, in sequence step 2, the ports 50, 51, 52, 53 of register bank 102 are connected, respectively, to buses 45, 66, 62, 64, and register bank 102 is in the process phase of operation in which data is being processed through ALU 50. Sequence step 3 repeats the connections described for sequence step 1. Sequence step 4 repeats the connections described for sequence step 2. The sequence of connections can be repeated in this manner indefinitely.

A particular advantage of the first embodiment of the invention, shown in FIG. 3, over the configurations shown in FIGS. 1 and 2 is the greater effective use of ALU 60 in processing data. In FIG. 3, register banks 100, 102 are repeatedly swapped between load/unload operations and the data processing operations. While register bank 100 is being unloaded and reloaded with data, register bank 102 is connected to ALU 60 and the data therein is being processed. When the I/O port and processor port interconnections are switched by load/store control logic block 135, the data in register bank 100 is processed while, concurrently, data is being unloaded and reloaded into register bank 102.

In effect, the load/store control logic 135 operates as a register function controller operatively connected to interchangeable register banks 100, 102. Load/store control logic 135, together with multiplexers 110, 110' and de-multiplexers 112, 112' selectively connect the processor ports of one of the interchangeable register banks (100 to 102) to ALU 60, whereby the data in that register bank is processed, while selectively connecting the idle ports of the other register bank to data buses 120, 145, whereby data is loaded into and unloaded from the other register bank. Multiplexers 110, 110' and de-multiplexers 112, 112' then permit the interconnections just described to be reversed, and the first multiplexer is connected to data load/unload buses 120, 145, while the second register bank is connected to the I/O processor ports for processing data therein. The ability to switch register banks 100, 102, between load/ unload functions and data processing functions shortens processing time and results in more efficient processor operation. The basic functional operation of the datapath 10 shown in FIG. 3 is the same as the datapath shown in FIG. 1, except for the switching between register banks 100 and 102. Consequently, the software written for the main processor logic control block 20 shown in FIG. 1 will operate virtually unchanged in the embodiment of FIG. 3, since the essential architecture and connections to CPU datapath are unchanged, once a register bank has been connected to ALU 60.

Figure 5:
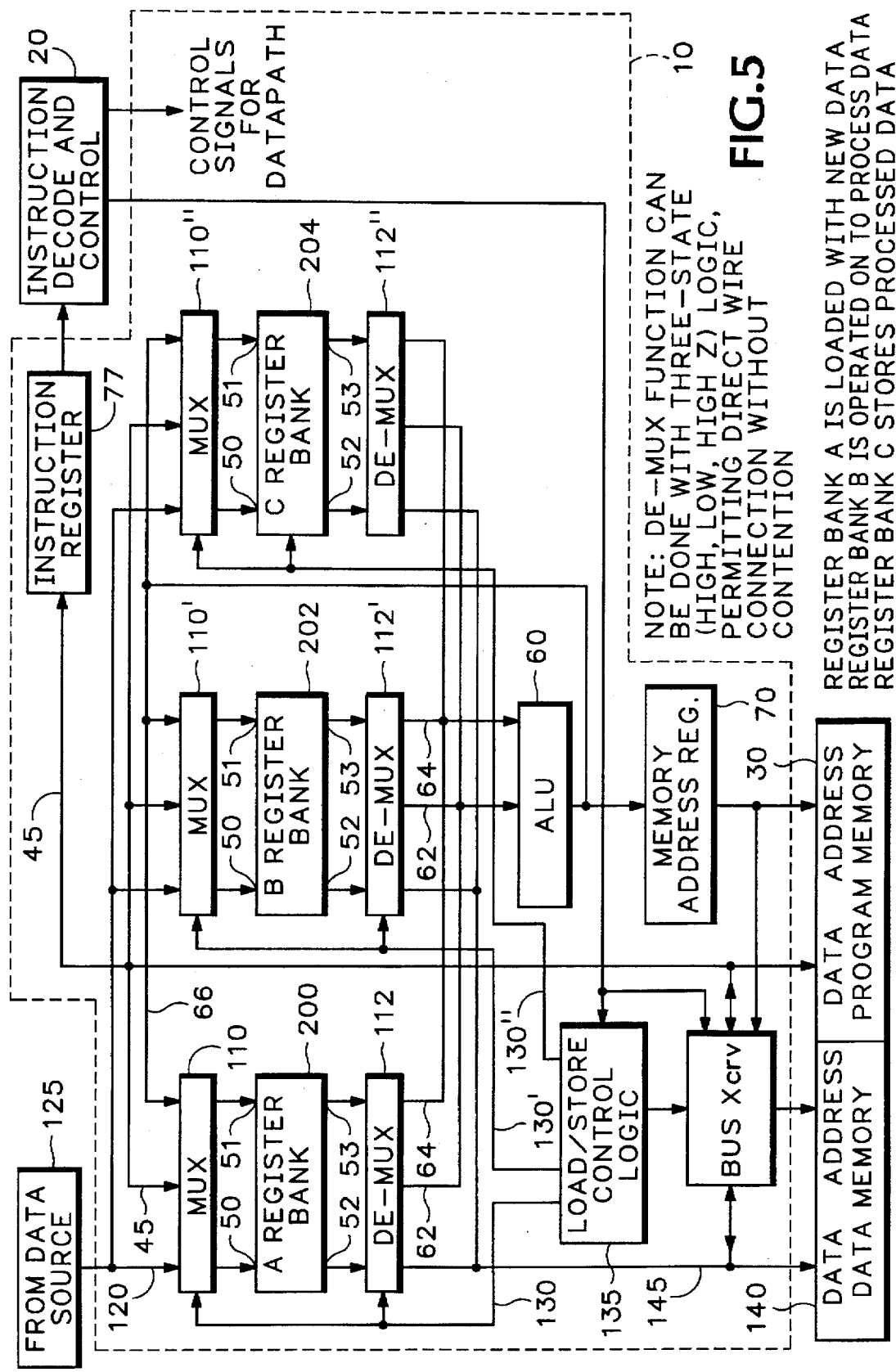
FIG. 5 is a schematic illustration of a second embodiment of a CPU datapath having three interchangeable register banks for concurrently performing processing, load, and unload functions.

FIG. 5 illustrates an alternative to the first embodiment of the present invention shown and described with respect to FIGS. 3 and 4. Although FIG. 5 has been slightly reconfigured to accommodate additional elements, it illustrates the same essential CPU datapath shown in FIG. 3 with the instruction decode and logic control block 20 moved to the upper right corner of the figure. Like elements in FIGS. 3 and 5 are identified with like reference numbers. The embodiment of FIG. 5 includes three register banks, 200, 202, 204 instead of the two register banks 100, 102 of the first embodiment of FIGS. 3 and 4. The function and interconnections to register banks 200, 202, 204 are essentially the same as for register banks 100, 102 in the first embodiment, except that the load and unload functions are performed separately on two of the register banks, whereas in the first embodiment the load/unload function is performed on one of the register banks while the other is processing data.

Like register bank 100 in the first embodiment, register bank 200 has two I/O ports 50, 51 and two processor ports 52, 53. I/O ports 50, 52 are selectively connected by multiplexer 110 to either data buses 45, 66, when register bank 200 is processing data, or to data bus 120 when data is being loaded from data source 125 into the register bank. Processor ports 52, 53 are selectively connected through de-multiplexer 112 to buses 62, 64, when register bank 200 is processing data, or to data bus 145, when register bank 200 is unloading data. As in the first embodiment, multiplexer 110 and de-multiplexer 112 are controlled by load/ store control logic block 135 via control line 130. The load/store control logic switches the connections to register bank 200 in accordance with a sequence which will be described below.

Register bank 202 has I/O ports 50, 51 and processor ports 52, 53. I/O ports 50, 51 are selectively connected to data buses 45, 66, and 120 through multiplexer 110'. Processor ports 52, 53 are selectively connected to buses 145, 62, 64 through de-multiplexer 112'. The connections to register bank 202 through multiplexer 110' and de-multiplexer 112' are the same as the connections for register bank 200 through multiplexer 110 and de-multiplexer 112. The operation of multiplexer 110' and de-multiplexer 112' is controlled by load/store control logic block 135 via line 130', the sequence of connections being described below.

Register bank 204 has I/O ports 50, 51 and processor ports 52, 53. I/O ports 50, 51 are selectively connected to data buses 120, 45, 66 through multiplexer 110". Processor ports 52, 53 are selectively connected to buses 62, 64 through de-multiplexer 112". The connections are made in the same manner as the connections to register bank 200 by multiplexer 110 and de-multiplexer 112. Multiplexer 110" and de-multiplexer 112" are controlled by load/store control logic block 135 via line 130".

The sequence of connections to register banks 200, 202, and 204 are shown in FIG. 6, which is a table showing how the register bank's ports are connected to the various buses, in sequence.

Referring to FIG. 6, the connections between I/O and processor ports 50, 51, 52, 53 on register bank 200 through multiplexer 110 and de-multiplexer 112, are illustrated in the left column of the table. In a sequence step 1 data in register bank 200 is being processed. Consequently, I/O ports 50, 51 are connected through multiplexer 110 to data buses 45 and 66 and processor ports 52, 53 are connected through de-multiplexer 112 to buses 62, 64, respectively. When in this process configuration, register bank 200 is connected to process data through ALU 60 in the same manner as the prior art CPU illustrated in FIG. 1. Concurrent with the just-described process configuration of register bank 200, register bank 202 (shown in the middle column of FIG. 6) is connected through de-multiplexer 112' to bus 145, for unloading data from register bank 202. Concurrent with the just-described configurations of register banks 200 and 202, port 50 of register bank 204 (shown in the right column of FIG. 6) is connected through multiplexer 110" data bus 120, whereby data is loaded into register bank 204. Thus, in the embodiment of FIGS. 5 and 6, register bank 200 is processing data and simultaneously with register bank 202 unloading data simultaneously with register bank 204 loading data.

Upon completion of sequence step 1, load/store control logic block 135 changes the connections made through multiplexers 110, 110' and 110" and de-multiplexers 112, 112' and 112" to provide the sequences illustrated in the second line of the table in FIG. 6. In this configuration, port 50 of register bank 200 is connected to data bus 120 to load data into register bank 200; ports 50, 51, 52, 53 of register bank 202 are connected, respectively, to buses 45, 66, 62, 64 to process the data in register bank 202; and port 52 of register bank 204 is connected to data bus 145 to unload data from register bank 204.

In sequence step 3, port 52 of register bank 200 is connected through de-multiplexer 112 to bus 145 to unload data from register bank 200; port 50 of register bank 202 is connected through multiplexer 110' to bus 120 to load data into register bank 202; and ports 50, 51, 52, 53 of register bank 204 are connected through multiplexer 110" and de-multiplexer 112" to buses 45, 66, 62, 64, respectively.

Sequence step 4 repeats the connection patterns described for sequence step 1 and sequence step 5 repeats the connection patterns for sequence step 2. Additional sequence steps will continue to repeat the pattern of sequence steps 1, 2, and 3 indefinitely, as long as data is provided for processing in the CPU datapath.

The embodiment of FIGS. 5 and 6 operates even more efficiently then the first embodiment of the present invention because there is complete separation of load, unload and process steps, which further reduces data processing delays associated with the loading and unloading of the register banks.

Figure 7:
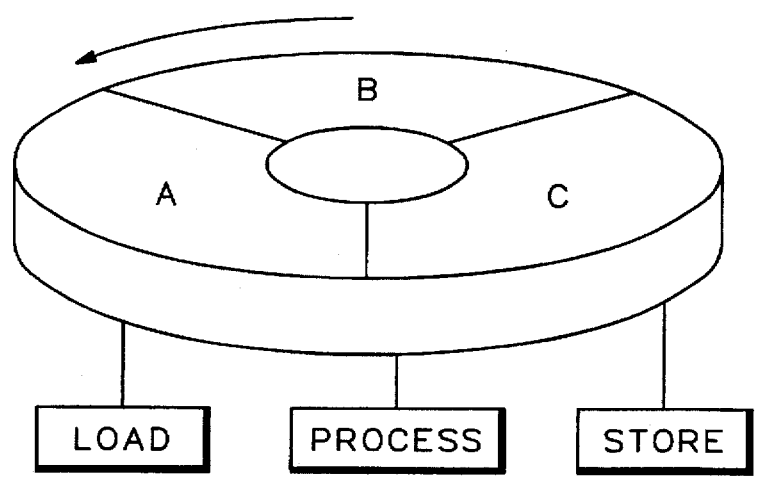
FIG. 7 is a schematic illustration of an alternative arrangement of the register banks shown in FIG. 5 configured in the likeness of a circular buffer.

From the table show in FIG. 6 it can be seen that the repetitive cycling of the connections between register banks 200, 202, and 204 resembles the operation of a circular buffer. FIG. 7 schematically illustrates the concept of a circular buffer configuration for register banks 200 (A), 202 (B), and 204 (C). Additional register banks could also be added to the circular buffer of FIG. 7, or to the CPU datapaths of the present invention shown in FIGS. 3 and 5, to perform additional specialized functions. For example, in addition to performing load—process—unload functions in separate register banks within a CPU, other useful functions could be performed, such as a specialized reconfiguring of the data in a register bank, by providing another set of connections to an additional register bank. The concept of adding register banks to the CPU datapath is show in the change between FIGS. 3 and 5. Additional register banks could be added in like manner.

The present invention is particularly useful in repetitive processing of streams of data, as is required for the processing of digitized video or audio signals. There are many types of processing that combine aspects of Digital Signal Processing (DSP) with other forms of digital computation. DSP is characterized by the repetitive execution of short loops of instructions on large blocks of data. Other processing is often done on these processed blocks of data, after the DSP phase of processing. For example, an FFT routine might be followed by some sequence of logical operations that use the newly computed FFT coefficients as part of a larger algorithm.

A common approach is to have separate DSP and more general CPU devices that communicate with each other in the course of an algorithm. These devices may be large systems or integrated circuits (ICs). This approach requires separate software and hardware development systems, and some form of systems integration to ensure proper operation. There are clear advantages in terms of shorter development time and simpler system hardware in being able to do efficient computation of DSP algorithms within the constraints of a standard CPU instruction set and architecture.

The main constraint of many general purpose CPUs is the ability to quickly load incoming data into the appropriate processing elements, and to then store the results to make way for new data. This constraint is particularly severe in register-based load-store architectures, as are found in many modern Reduced Instruction Set Computers (RISC). In RISC and other register based computers, operations are commonly performed only on data that are in the set of working registers. That is, previously processed data must be stored from the set of registers to system memory before new data can be accepted for more processing. Many useful DSP functions can be performed on a standard RISC CPU using relatively few registers, but much time is consumed emptying and then filling these registers. The object of this invention is to reduce the overhead of these data movement instructions by replacing them with a mechanism to rotate among sets of registers, such that while one set of registers is being operated on for computation ("processing"), one or more alternate register sets are involved in data movement (I/O). The I/O operations proceed concurrently with useful data processing.

There can be two, three, or more register sets that rotate in function. In the simplest case, there are two register sets, A and B. While register set A is storing processed data, and then loading new data, processing continues on register set B. When processing is complete on the data in register set B, the function of the register sets rotates, such that register set B is unloaded and then loaded, while processing is performed on the data in register set A. When processing is complete on the data in register set A, the function of the register sets again rotates.

Completion of processing in a register set is signaled by a software instruction that replaces the store or load instructions that would ordinarily occur in the algorithm as applied to that particular machine. In this way, DSP-like processing is accomplished with an instruction set that is almost identical to the ordinary CPU instruction set.

Since the address patterns needed by many DSP algorithms are fixed and can be predetermined, they can be generated by a number of simple means. One such means is a memory (either volatile or non-volatile, depending on application) and a counter that drives the memory address pins such that all memory addresses are accessed in a sequential way. The data read out of that memory is the address needed by the DSP algorithm at that point in time. Another such means is a user programmable state machine which algorithmically generates the required addresses. This activity is controlled by the block labeled "Load/Store Control Logic" on the diagrams, and is triggered by the receipt of the appropriate software instruction decoded in the course of processing the DSP-like or block structured algorithm.

Since over-all operation is divided into DSP-like and more general operation, the processor needs to be able to access the processed blocks of data for more general operations. This access is provided by the Bus Transceiver, labeled as "Bus Xcvr" in FIGS. 3 and 5.

Operation with three register sets, or banks, is very similar to the two bank case, except that now input and output (load and store) operations are separated, and can now be conducted concurrently and independently, along with the DSP-like or block processing being performed on the third register set, or bank. Instead of the block processing being performed in an A-B, A-B pattern, of alternating I/O and processing functions, it would rotate among the three register sets or banks to perform the three main functions of load, process, and store.

Operation can be extended to more than three register sets, or banks. In the general case, all of the register sets are arranged to form a circular buffer with multiple register banks, one for each major function. Note that in the general case, there can be functions other than simple input, process, and output assigned to these regions of active registers. For example, additional data processing units can replace the simple address generators of the two and three register set implementation to form an overall pipelined set of processors with data communication through rotation of register sets or banks.

What is claimed is:

1. A datapath for a register-based CPU used in processing data from one or more external data sources carried to and from the CPU and data memory via one or more data busses under commands from one or more external controllers, the datapath comprising:

one or more arithmetic processors operatively connected to an external programmable controller for processing data as directed by the programmable controller;

a plurality of data storage register banks each having one or more input/output ports;

a register function controller operatively connected to said register banks and to the external programmable controller for selectively connecting the input/output ports of said register banks, as directed by the programmable controller, to said one or more selected arithmetic processors and to selected data sources and data memory, whereby each said register bank is intermittently connected to said one or more arithmetic processors for processing data therein and to selected data sources and data memory for respectively loading and unloading data to the register bank; and said register function controller including a programmable state machine which, when data is loaded into a register bank under the control of said register function controller, selectively loads the data into the register bank in accordance with an algorithmically generated address sequence programmed into said state machine, whereby data is loaded into each register bank in accordance with pre-programmed instructions which partially processes the data in a register bank to reduce the computations performed by the arithmetic processors.

2. A datapath for a register-based CPU as in claim 1 including multiplexers operatively connected to the input/output ports of each said register bank, said register function controller being operatively connected to said multiplexers for selectively connecting the input/output ports of said register banks to said one or more arithmetic processors and to selected data sources and data memory by means of said multiplexers.

3. A datapath for a register-based CPU as in claim 2 including at least three data storage register banks, whereby one register bank is operatively connectable to said one or more arithmetic processors, concurrent with one register bank being operatively connected to selected data sources, and concurrent with one register bank being operatively connected to data memory, whereby concurrently at least one register bank is loaded with data, at least one register bank is connected to the ALU for data processing, and at least one register bank is unloading data to the data memory.

4. A method for use of a datapath in a register-based CPU of the type which processes data by means of one or more arithmetic processors in accordance with instructions from the CPU, and which moves data from one or more data sources carried to and from the CPU by one or more data buses for storage in data memory following arithmetic processing under commands from one or more external controllers, the method comprising the following steps:

a) providing at least three groups of data storage register banks operatively connected to a register function controller which selectively connects selected register banks to one or more data sources, to data memory, and to one or more arithmetic processors, the register function controller being programmable to load data into register banks in accordance with programming instructions, the register function controller selectively connecting the register banks and processing the data therein in accordance with the following:

b) connecting a first group of register banks to one or more data sources, connecting a second group of register banks, when loaded with data in accordance with step c), to one or more arithmetic processors, and connecting a third group of register banks, when the data therein has been processed in accordance with step d), to data memory;

c) loading data into the group of register banks connected to the one or more data sources in accordance with algorithmically generated address sequences programmed into the register function controller;

d) processing the data in the group of register banks connected to the one or more arithmetic processors;

e) unloading into data memory the data from the group of register banks connected to data memory;

f) causing the register function controller to alter the connections of the first, second, and third register banks such that the third group of register banks is connected to one or more data sources, the first group of register banks, when loaded with data in accordance with step c), is connected to one or more arithmetic processors, and the second group of register banks, when the data therein has been processed in accordance with step d), is connected to data memory, and repeating steps c), d), and e);

g) causing the register function controller to alter the connections of the first, second, and third register banks such that the second group of register banks is connected to one or more data sources, the third group of register banks, when loaded with data in accordance with step c), is connected to one or more arithmetic processors, and the first group of register banks, when the data therein has been processed in accordance with step d), is connected to data memory, and repeating steps c), d), and e); and h) repeating steps b) through g) until the process is terminated by the CPU.

5. A method for use of a datapath in a register-based CPU as in claim 4 in which steps c), d), and e) are carried out concurrently.

* * * * *